Feb. 16, 1932. M. PIER ET AL 1,845,439
LIQUID AND OTHER HYDROCARBONS AND DERIVATIVES THEREOF BY THE
DESTRUCTIVE HYDROGENATION OF CARBONACEOUS MATERIALS
Filed March 31, 1928
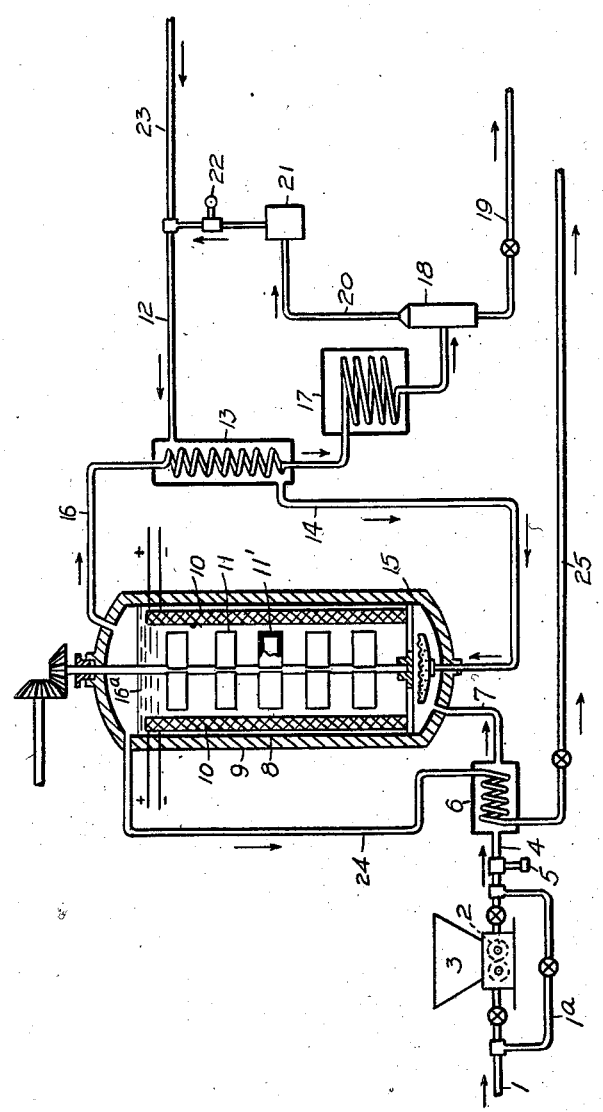
MATHIAS PIER
WALTER SIMON
INVENTORS
BY
ATTORNEYS Patented Feb. 16, 1932

1,845,439

UNITED STATES PATENT OFFICE

MATHIAS PIER, OF HEIDELBERG, AND WALTER SIMON, OF LUDWIGSHAFEN-ON-THE-RHINE, GERMANY, ASSIGNORS, BY MESNE ASSIGNMENTS, TO STANDARD-I. G. COMPANY, OF LINDEN, NEW JERSEY, A CORPORATION OF DELAWARE

LIQUID AND OTHER HYDROCARBONS AND DERIVATIVES THEREOF BY THE DESTRUCTIVE HYDROGENATION OF CARBONACEOUS MATERIALS

Application filed March 31, 1928, Serial No. 266,446, and in Germany August 9, 1926.

In the destructive hydrogenation of carbonaceous materials, such as the various kinds of coal, tars, mineral oils, distillation, extraction and conversion products and residues thereof and the like by treatment with hydrogen or gases containing or giving off hydrogen at elevated temperatures and under pressure, it is known that especially good yields of valuable products such as benzine, lubricants, heavy oils for Diesel engines, oils for illuminating purposes and the like, are obtained by the employment of catalysts.

We have now found that according to this process very good results may be obtained by the employment as catalysts of the precious metals or lead or tin or of their compounds on supports of magnesia or magnesite or chromium oxide. As examples of these catalysts ruthenium, palladium, platinum, gold, lead or tin or magnesia or magnesite or platinum or gold or chromium oxide, and the like may be mentioned. Generally all compounds of the metals specified may be employed since they are reduced to a considerable extent under the conditions of working. These catalysts may be used either alone or in mixture with other substances which may also have a catalytic effect.

The process according to the present invention is carried out under pressure of at least 20 atmospheres, preferably under high pressure of 50 atmospheres or more and with an excess of hydrogenating gas employed in the form of a current. Preferably the gas is employed in a circulatory system while making up for the consumed portion by the addition of fresh gas. Instead of hydrogen, gases containing hydrogen or gases which contain combined hydrogen and from which the hydrogen may be set free in the reaction vessel by the action for example of water vapor on carbon monoxide or hydrocarbons or by cracking methane may be used. Care should be taken that those parts of the apparatus which come into contact with the hot reacting materials are free from all substances which would lead to the formation of methane and the separation of carbon. The treatment may be effected in several stages, and the process may be carried out in the liquid or vapor state. By employing for example porous layers or plates on which the material to be treated rests and through which the hydrogenating gas is pressed in, a most intimate contact of the materials with the gas may be effected.

In the accompanying drawing an apparatus for carrying out the process according to the present invention is illustrated diagrammatically partly in vertical section. The invention is, however, not limited to the apparatus illustrated, which may be varied at will in accordance with the conditions of working. Referring to the drawing in detail reference numeral 1 indicates a feed line from any convenient source of liquid raw material. The line 1 discharges to a grinding mechanism 2 fitted with a hopper 3 through which solid materials may be admitted. If desired, the grinding mechanism can be by-passed by line 1a when no solid materials are used. The suspension of solid material in liquid or the liquid alone may be then forced by pump 5 through a line 4 to a heat exchanger 6 and thence by line 7 into a reaction chamber 8. The reaction chamber is constructed in any preferred manner and should be adapted to withstand high pressures, for example above 20, 100 or even as high as 1000 atmospheres, as well as the corrosive effects of the reactants. The vessel is preferably protected from loss of heat by a suitable insulating cover 9 and may be heated by electric coils 10 which are arranged within the drum. The contents of the drum are preferably kept in a state of agitation by means of a stirring mechanism 11 and the catalytic materials 11' as indicated above may be attached to the stirring mechanism so that the catalyst is brought into intimate contact with the contents of the vessel.

Hydrogen under high pressure is forced through a line 12, heat exchanger 13 and then by line 14 into the base of the reactor 8 into which it is preferably discharged through a spray pipe 15. A liquid level may be maintained in the drum, for example at the point 16a and gas and vaporous products may be continuously withdrawn by vapor line 16′ which is in communication with exchanger 13 and a cooling coil or condenser 17. The condensate and gas is discharged into a separating drum 18 from which the distillate is removed by line 19 to storage, not shown. The gas may be taken off by a pipe 20 to a purifying system indicated at 21, and which may comprise a scrubbing system preferably carried out at high pressure using, for example, soda to remove hydrogen sulphide and oil to remove hydrocarbon constituents from the gas. Purified gas is then recompressed by a booster pump 22 and is forced again into the hydrogen feed line 12. Fresh hydrogen may be introduced by line 23. If desired, oil may be continuously removed from the drum by a line 24 which communicates with heat exchanger 6 and which is withdrawn to storage, not shown, by a suitable line 25.

The following example will further illustrate how our invention may be carried out in practice, but the invention is not limited thereto.

Example

A middle oil from crude mineral oil is passed in a current of hydrogen in excess at 450° centigrade and under a pressure of 200 atmospheres over a catalyst consisting of gold on magnesite as a carrier. The gas is pumped round in the circulatory system, the pressure being continuously maintained, and the hydrogen which has been consumed in the reaction being replaced by fresh gas. A light coloured product is obtained, which contains 80 to 90 per cent of substances of low boiling point, and which may be used as a motor fuel.

Ruthenium or lead or tin for instance may also be employed in the place of gold on magnesia as a carrier.

What we claim is:—

1. A process for the destructive hydrogenation of lituminous materials which comprises treating said materials with hydrogen under a pressure of at least 20 atmospheres and a temperature sufficient to effect the reaction in the presence of a catalyst selected from the class consisting of ruthenium, platinum, palladium and gold deposited on a support selected from the class consisting of magnesia, magnesite and chromium oxide.

2. A process as defined in claim 1 wherein the support is magnesia.

3. A process as defined in claim 1 wherein the support is magnesite.

4. A process as defined in claim 1 wherein the support is chromium oxide.

5. The process of producing gasoline, which comprises passing a middle oil in a current of hydrogen in excess at 450° C. at 200 atmospheres pressure over a catalyst consisting of gold and magnesite.

In testimony whereof we have hereunto set our hands.

MATHIAS PIER.
WALTER SIMON.